(12) United States Patent
Bosbach et al.

(10) Patent No.: US 11,487,262 B2
(45) Date of Patent: Nov. 1, 2022

(54) METHOD AND APPARATUS FOR PROTECTING PUMP UNITS FROM CYBER ATTACKS

(71) Applicant: KSB SE & Co. KGaA, Frankenthal (DE)

(72) Inventors: Franz Gerhard Bosbach, Frankenthal (DE); Soenke Brodersen, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 284 days.

(21) Appl. No.: 16/764,273

(22) PCT Filed: Oct. 22, 2018

(86) PCT No.: PCT/EP2018/078893
§ 371 (c)(1),
(2) Date: May 14, 2020

(87) PCT Pub. No.: WO2019/096545
PCT Pub. Date: May 23, 2019

(65) Prior Publication Data
US 2020/0278651 A1 Sep. 3, 2020

(30) Foreign Application Priority Data
Nov. 15, 2017 (DE) ............ 10 2017 220 380.3

(51) Int. Cl.
*G05B 19/042* (2006.01)
*H04L 9/40* (2022.01)
*H04L 67/12* (2022.01)

(52) U.S. Cl.
CPC ........ *G05B 19/0425* (2013.01); *H04L 63/145* (2013.01); *H04L 63/1466* (2013.01); *H04L 67/12* (2013.01)

(58) Field of Classification Search
CPC ... G05B 19/0425; G05B 19/042; H04L 63/45; H04L 67/12
See application file for complete search history.

(56) References Cited

U.S. PATENT DOCUMENTS 6,655,922 B1   12/2003 Flek
9,781,603 B1 * 10/2017 Nenov ............... H04W 12/122
(Continued)

FOREIGN PATENT DOCUMENTS

DE    198 48 726 A1   4/2000
DE    602 03 458 T2   9/2005
(Continued)

OTHER PUBLICATIONS

International Search Report (PCT/ISA/210) issued in PCT Application No. PCT/EP2018/078893 dated Feb. 12, 2019 with English translation (four (4) pages).
(Continued)

*Primary Examiner* — Michael A Keller
*Assistant Examiner* — Jsing Forng Lin
(74) *Attorney, Agent, or Firm* — Crowell & Moring LLP

(57) ABSTRACT

A method for protecting a pump unit comprising a variable-speed fluid-conveying device, particularly a centrifugal pump, a drive and a control system, is provided, with protection in the event of cyber attacks. Signals relating to the speed and/or speed regulation of the fluid-conveying device are detected and then evaluated to detect a maliciously effected, anomalous operation of the pump unit characteristic of a cyber attack. At least one nominal variable and at least one actual variable derived from the analyzed signal are compared. Subsequently, a unit transmits signals to components of the pump unit in order to control the
(Continued)

operation of the fluid-conveying device in a state in which the fluid-conveying device is protected from current and/or other cyber attacks.

13 Claims, 2 Drawing Sheets

(56) References Cited

U.S. PATENT DOCUMENTS

| | | | |
|---|---|---|---|
| 2012/0111114 A1 | 5/2012 | Emde et al. | |
| 2015/0346706 A1 | 12/2015 | Gendelman | |
| 2016/0330225 A1* | 11/2016 | Kroyzer | H04L 63/1425 |
| 2018/0137277 A1* | 5/2018 | Mestha | G05B 23/0227 |
| 2018/0157838 A1* | 6/2018 | Bushey | H04L 63/1483 |
| 2018/0159877 A1* | 6/2018 | Holzhauer | H04L 63/1416 |
| 2019/0323494 A1* | 10/2019 | Juul Nielsen | F04D 13/06 |
| 2020/0106743 A1* | 4/2020 | Park | H04L 63/308 |

FOREIGN PATENT DOCUMENTS

| | | |
|---|---|---|
| DE | 602 06 711 T2 | 5/2006 |
| DE | 10 2010 027 999 A1 | 10/2011 |
| EP | 2 500 579 A1 | 9/2012 |
| EP | 2 279 465 B1 | 4/2014 |
| EP | 2 433 010 B1 | 9/2015 |
| EP | 3 242 033 A1 | 11/2017 |
| WO | WO 2017/090045 A1 | 6/2017 |

OTHER PUBLICATIONS

German-language Written Opinion (PCT/ISA/237) issued in PCT Application No. PCT/EP2018/078893 dated Feb. 12, 2019 (seven (7) pages).
German-language Search Report issued in German Application No. 10 2017 220 380.3 dated Jul. 23, 2018 with partial English translation (nine (9) pages).
Russian-language Office Action issued in Russian Application No. 2020116204/28 dated Nov. 26, 2021 (four (4) pages).

* cited by examiner

METHOD AND APPARATUS FOR PROTECTING PUMP UNITS FROM CYBER ATTACKS

CROSS REFERENCE TO RELATED APPLICATIONS

This application is a continuation of PCT International Application No. PCT/EP2018/078893, filed Oct. 22, 2018, which claims priority under 35 U.S.C. § 119 from German Patent Application No. 10 2017 220 380.3, filed Nov. 15, 2017, the entire disclosures of which are herein expressly incorporated by reference.

BACKGROUND AND SUMMARY OF THE INVENTION

The present invention relates to a method and apparatus for protecting a pump unit, in particular a centrifugal pump unit, from cyber attacks.

The targeted influencing or destruction of a centrifugal pump is one cyber attack means. Cyber attacks are targeted attacks on a specific infrastructure of important computer networks from outside. Such computer networks are also increasingly used for controlling systems.

Centrifugal pumps and in particular centrifugal pump units, comprising pump, motor, control electronics and, if necessary, a control valve, play a significant role in production systems. Normally, centrifugal pumps are driven by regulated or unregulated electric motors.

If hackers attack industrial systems by means of cyber attacks, then it is frequently the case that power supplies are interrupted directly. A production outage is the consequence. For attacks which act in a more differentiated manner than a general shutdown, a more complex procedure is required. If specific processes are targeted, exact knowledge about their structure and control is needed. This makes an attack on specific processes more difficult. However, all processes with fluids have fluid-conveying devices of more or less standardized designs, which are broadly more identifiable and can be attacked in a more structured manner than entire processes.

For example, the speed of the centrifugal pump can be manipulated by a cyber attack.

As a result of said manipulation, the centrifugal pump can be moved into a less beneficial efficiency range, which causes high additional operating costs. In addition, partial or complete destruction of the drive of the centrifugal pump or the centrifugal pump itself or of other parts of the system is conceivable.

Pumps are designed and configured exactly for the specific use in a system. Some pumps are even customized designs so that, following any damage, some weeks or months can elapse until replacement parts or replacement pumps are ready. In the worst case, the system remains at a standstill until then. Thus, high production outages can arise as a result of such attacks on fluid-conveying devices.

In the worst case, even explosions can be caused by such manipulations. In the case of a chemical system, the consequences would be fatal. In oil or gas conveying systems, there can be far-reaching consequences for the environment.

In centrifugal pumps, the controlled adjustment of the speed is designated speed control. This control is used for the energy-efficient adaptation of the pump speed to the values needed in operation (output data). Speed controls by means of a frequency converter are the most efficient method for adapting the pump output to variable flow requirements.

Controlled-speed pumps use only the amount of energy which is needed for a specific task. As compared with other control methods, frequency-controlled speed control offers the highest system efficiency and thus the most efficient utilization of energy for a specific purpose.

Speed-controlled pumps replace the usual procedure of a fixed speed pump for the maximum operating point, the excess output from which is throttled by a valve. This control valve is still available for small changes and for process control, even if this would not be necessary as a result of the speed control of the pump.

The speed of a centrifugal pump is controlled with the frequency converter described by means of the variation of frequency and voltage for the three-phase asynchronous motor which is used, for example. This method offers the optimum benefit with relatively little outlay and high efficiency. The frequency converter converts the voltage and frequency of the mains power supply in accordance with predefined patterns, such that the motor can be operated at different speeds. In this type of frequency control, the following problems can occur:

noises in the motor, which are sometimes transmitted into the system as interfering noise, high voltage peaks at the output of the frequency converter to the motor.

To measure, control and regulate sequences, for example for the automation of processes and for the monitoring of large systems, so-called industrial control systems (ICS) are used in many branches of the industry. These are frequently used in the production industry. For example, the speed of a pump or the position of a valve controlling a flow can be influenced by such systems.

In the past, ICS were decoupled physically from other IT systems and networks, and therefore protected from external influences. Therefore, their IT security was of lower importance.

With the introduction of IT systems from the office environment and the increasing networking of the ICS, these systems are currently exposed to similar threats as systems from the classical company IT.

The attacker's procedure differs, depending on their target. In systems which can be reached directly via the internet, targeted attacks on the system are started. Therefore, weak points in the attacked system are used directly. This can possibly relate to the operating system or service applications.

In many attacks which have been known in recent years, use is made of so-called spear-phishing attacks as an entry into the company. In this way, a type of "bridgehead" is directed at a computer in the company. From this bridgehead, the network is explored and further systems are identified. Once the attackers have reached the actual target system, they extract the information sought therefrom and perform the manipulation. When the attacker has reached his target, he attempts to cover his tracks and to remain undiscovered.

Other attacks are aimed at closed systems by propagation via mobile data storage means, which are carelessly attached to a closed system. The routine itself is installed by being read from the mobile data storage means.

A computer-implemented method for cyber security management for an industrial control system is described in EP 2 279 465 B1. Here, a centralized system security manager program module is provided. This can be introduced via a processing device. The centralized system security manager program module is integrated into an integrated command and control user interface in a monitoring, control and data acquisition unit.

EP 2 500 579 A1 describes a method for monitoring a centrifugal pump driven by an electric motor. It is explained that the power consumption and the load current of the electric motor are critical for the formation of torque. Since values of the power consumption or the load current are normally present in any case in motor control systems, no additional sensors are required for monitoring the centrifugal pump.

EP 2 433 010 B1 describes a method and an apparatus for determining the operating point of a working machine. An amount of power consumed by the working machine and its delivery rate characterize an operating point. In the method, operating point-dependent measured variables of the working machine are detected by sensors. The measured values are stored and evaluated during operation.

The object of the invention is to provide a method and apparatus by means of which cyber attacks to above-described pump units, in particular centrifugal pump units, comprising a fluid-conveying device, in particular a centrifugal pump, a motor, control electronics and, if necessary, control valve, can be prevented effectively. The components of the pump unit itself and all of the components used in the system should be protected reliably, so that failure of the system is prevented. The method and apparatus should be simple to implement in the system, so that a device or retrofitting is associated with the lowest possible expenditure on costs for the manufacturer and operator.

According to the invention, this object is achieved by a method for protecting a pump unit from cyber attacks, and a unit for performing the method. Preferred variants can be gathered from the sub-claims, the description and the drawings.

Accordingly, firstly a method is proposed for protecting a pump unit comprising a speed-controlled fluid-conveying device, in particular a centrifugal pump, a drive and a control system, during cyber attacks. According to the invention, firstly at least one first signal which relates to the speed and/or speed control of the fluid-conveying device is detected. The detection of the first signal can optionally also be carried out by sensors.

The at least one first signal is forwarded to a unit or acquired by a unit and evaluated there. In the unit, within the context of an evaluation, at least one target variable and at least one actual variable derived from the first signal are compared with each other. If there are considerable deviations or if predefined limiting values are overshot or undershot, the unit is able to determine via the evaluation whether a cyber attack on the pump unit, for example on the drive of the fluid-conveying device or another component connected to the latter, has taken place.

In the event that in the course of this evaluation, the unit determines a willful illegal operation of the pump unit, in particular of the drive, the control system and/or the fluid-conveying device, it reacts by outputting at least one second signal and, as a result, brings the pump unit to a secure state, by which the current and/or future cyber attacks are effectively warded off. At the same time, in a reaction to the at least one second signal, the fluid-conveying device is changed to control-conformant operation, by components of the fluid-conveying device and/or the control system and/or of the drive being adjusted appropriately.

The unit preferably analyses signals received by the speed-controlled fluid-conveying device and control system. In particular, the following phenomena can point to a cyber attack:

systematic approach to speed limits,
rapid start and stop cycles,
fast ramps with which the speed is increased or reduced,
excitation of vibrations,
anomalies in the activation which as compared with the usual behavior.

Following an analysis of appropriate input data, the unit sends signals to components of the pump unit to bring about a secure state protected from cyber attacks. The method according to the invention is suitable both to ward off cyber attacks on a central network and to ward off cyber attacks on individual components of the pump unit.

In addition to control electronics, at least one control component, for example a control valve, can also belong to the control of the pump unit according to the invention.

The term cyber attack in the present case designates any willful imposition from outside of an illegal operation.

In a particularly advantageous variant of the invention, the unit has a monitoring module. The monitoring module can have an evaluation unit. The evaluation unit can in turn be connected to a memory. Furthermore, the monitoring module preferably has an input unit and an output unit.

In an advantageous variant of the invention, the monitoring module is connected to a motor module. The monitoring module and the motor module can be completely decentralized from a process control system or a network or, in an alternative variant, can also be part of a process control system or network. It is important that there is no kind of link, possibly even strict separation, so that the monitoring module can monitor the pump unit completely independently, so to speak, can possibly initiate a secure state and output an appropriate alarm.

Preferably, a motor control device is connected to a motor module, the evaluation unit of the monitoring module and the drive, the drive preferably being formed as an electric motor.

To protect the pump unit or the entire system, operating parameters in the pump unit are varied by an evaluation, control and regulating unit, such that the drive of the fluid-conveying device enters a stable state and is effectively protected.

If appropriate, an iterative method is applied, in which individual steps or step sequences or the entire method are repeated once or many times.

A possible cyber attack is detected by the analysis of the operating parameters. To this end, the measured values are compared with a number of operating state patterns stored in the motor control device. Should an operating state which is not stored be detected in the pump unit, an emergency state is automatically initiated. The drive and the fluid-conveying device or the entire pump unit is then preferably disconnected from the network via which the cyber attack has been carried out, so that no further cyber attack is possible. In this way, it is likewise possible to avoid misuse as a result of inadvertent operating errors.

In one embodiment, provision is made for the drive to be an electric motor and for the speed control of the fluid-conveying device to be carried out by a frequency converter connected to the drive. Advantageously, in this case the at least one first signal relates to a state or operating parameter of the frequency converter.

In a variant of the invention, the unit is a decentralized control and/or regulating apparatus. The unit can be attached directly to or in the fluid-conveying device, the control system or the drive. Using said decentralized unit, protection from cyber attacks is possible even when the entire process control system or network has already been infected by the cyber attack. The independent decentralized unit can detect unfavorable operating states of the drive or the fluid-conveying device and therefore detect a cyber attack. Furthermore, said decentralized unit can disconnect the drive, the fluid-conveying device or one or more other components of the pump unit from the network or the process control system until the cyber attack has been warded off.

In a preferred variant of the invention, the unit is set up in such a way that, in the command structure, it is dominant as compared with the process control system or the network to which the pump unit or certain components of the same are connected. If the unit detects a cyber attack, then it disconnects the corresponding components of the pump unit, e.g. the drive or parts of the control system, completely from the process control system or the network and thus protects the pump unit from the current and further attacks.

In addition to bringing about a secure state, the unit can additionally or alternatively initiate alarm messages, so that the operator is informed of the detected cyber attack.

In a variant of the invention, the unit has a data memory. The data memory is used to detect and store technological data of the drive and/or of the fluid-conveying device and/or of the control system and/or of further components of the pump unit.

Preferably, the unit has at least one terminal for a sensor. In particular, vibration, pressure, flow or temperature sensors are suitable for the detection of cyber attacks.

In order to bypass rapid switching of the drive on and off and as a result to ward off the cyber attack, an energy storage unit can be used, which, for example, can be embodied as a battery or capacitor combination.

In addition, excitation of vibrations within the fluid-conveying device or the drive is to be avoided. Using provoked load changes, interactions, for example between impeller and guide wheel of the pump unit (in particular in a configuration as a centrifugal pump unit) or else between other components can lead to pressure fluctuations which, within the fluid-conveying device or the entire system, can experience resonance. In the event of targeted excitation of these resonant frequencies, vibration amplitudes which could lead to damage or even destruction of the fluid-conveying device or of the entire system within which the pump unit is arranged could be produced.

Said states are already known in control devices of centrifugal pump units, since when starting up and running down the systems, it is precisely a matter of overcoming these operating states as quickly as possible in order not to cause any damage. There is also the possibility of using already known system data to avoid targeted damage within the context of a cyber attack or human error.

In a variant of the invention, an uninterruptible power supply (UPS) is used. As a result, during cyber attacks, the power supply of the drive or other parts of the pump unit can be ensured.

A further important feature of a UPS is the maximum bypass time, which depends on the capacity of the batteries. It can be a few seconds or several hours, depending on need. In the event of a high demand for power and bypass time, power generating units for recharging the batteries can also be used.

The present invention also relates to a unit for performing the method according to the invention, which is set up to protect a pump unit during cyber attacks. Here, it is obvious that the same advantages and properties result as for the method according to the invention, for which reason a repeated description will be omitted at this point.

The unit is preferably connected to a computer network and set up to interrupt the connection to the computer network automatically when a willfully caused illegal operation of the pump unit is determined by evaluating the at least one first signal.

According to an embodiment, provision is made for the unit to have a signal processing module for processing the at least one first signal, an evaluation module for evaluating the at least one first signal, a memory with data of the fluid-conveying device and/or the drive and/or the control system and preferably an input/output unit.

The unit is advantageously further set up to perform driving/regulation of components of the pump unit automatically when a willfully caused illegal operation of the pump unit is determined by evaluating the at least one first signal, in order to change the pump unit to control-conformant operation and to a state protected from the current and/or from further cyber attacks.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
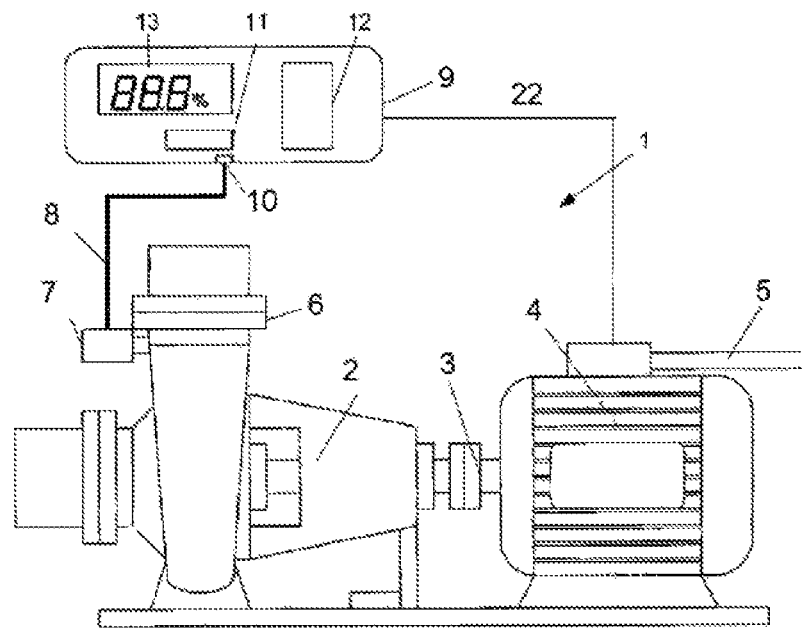
FIG. 1 shows a centrifugal pump arrangement.

FIG. 1 shows an arrangement 1 having a fluid-conveying device 2 which is embodied as a centrifugal pump and which is connected via a shaft 3 to a drive 4. The drive 4 is embodied as an asynchronous motor which drives the centrifugal pump 2. The drive 4 is fed from a mains feed line 5. Arranged on a pressure connector 6 of the centrifugal pump 2 is a sensor 7 for measuring the pressure-side pressure or final pressure of the centrifugal pump 2. The sensor 7 is connected to a unit 9 via a line 8.

The unit 9 is further connected to the drive 4 via a line 22. The unit 9 evaluates signals from the drive 4 and/or the sensor 7 and, as a result, is able to analyze critical operating states, which allows conclusions to be drawn about a cyber attack on the drive 4. For this purpose, the unit 9 uses the method according to the invention.

Preferably, in order to perform the method according to the invention, characteristic variables of the drive 4 are used, such as, for example, the nominal output. From these parameters, it is also possible to derive or calculate other parameters. The unit 9 has suitable terminals 10 for detecting the signals from the sensors 7. The terminals 10 are embodied as signal inputs in this embodiment.

In this embodiment, the unit 9 has a signal processing module 11. The signal processing module 11 can, for example, also be capable of determining a rotational sound frequency with relatively high accuracy.

The method proceeding in the unit 9 is controlled and coordinated by a computing module 12. Furthermore, the unit 9 preferably has a display and operating element 13.

On the arrangement, a further pressure sensor terminal, not shown here, can be provided which, for example, is used to detect the pump suction pressure. Furthermore, the arrangement can have further signal inputs, not shown here, and/or a serial bus interface, for example for entering or reading parameters.

Figure 2:
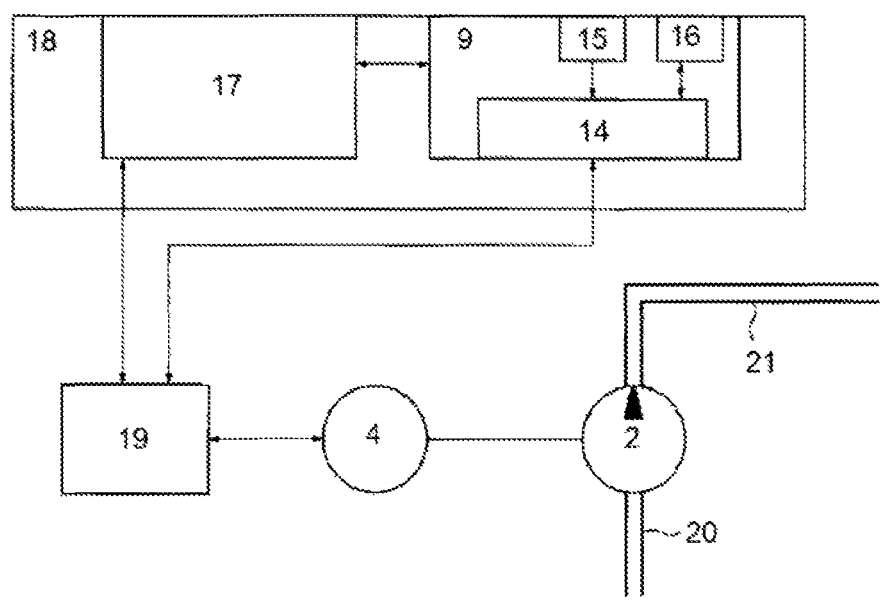
FIG. 2 shows a block diagram of a unit to ward off a cyber attack.

FIG. 2 illustrates a block diagram and shows a unit 9 controlling and/or regulating a centrifugal pump 2. In the illustration according to FIG. 2, the unit 9 has an evaluation module 14, a memory 15 connected to the evaluation stone 14 and an input/output unit 16 likewise connected to the evaluation module 14.

The unit 9 is connected to a motor module 17. The unit 9 and the motor module 17 can be part of a process control system 18 but do not have to be. A motor control device 19 is connected to the motor module 17, the unit 9 of the centrifugal pump 2 and to the drive 4. The centrifugal pump 2 is supplied with liquid medium to be conveyed via a feed line 20 and pumps the medium to be conveyed out via a discharge line 21. The data traffic between the aforementioned components is indicated by arrows.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF DESIGNATIONS

1 Arrangement
2 Fluid-conveying device (centrifugal pump)
3 Shaft
4 Drive
5 Mains feed line
6 Pressure connector
7 Sensor
8 Line
9 Unit
10 Terminal
11 Signal processing module
12 Computing module
13 Operating element
14 Evaluation module
15 Memory
16 Input/output unit
17 Motor module
18 Process control system
19 Motor control device
29 Feed line
21 Discharge line

What is claimed is:

1. A method for protecting a pump unit during cyber attacks, the pump unit including a speed-controlled fluid-conveying device, a drive and a control system, comprising the steps of:
   detecting using at least one sensor at least one first signal corresponding to a speed of the fluid-conveying device, a speed control of the fluid-conveying device, or both;
   evaluating the at least one first signal using an evaluation unit, wherein during the evaluation at least one target variable and at least one actual variable derived from the at least one first signal are compared with each other to determine whether a cyber attack is occurring;
   outputting at least one second signal from the evaluation unit if the evaluation determines an unauthorized operation of the pump unit is occurring based on the at least one first signal; and
   adjusting based on the at least one second signal components of the fluid-conveying device, the control system, or both, to control operation of the fluid-conveying device into a state of the pump unit in which the pump unit is protected from the cyber attack, further cyber attacks, or both,
   wherein the adjusting step includes activation of an energy storage device for maintaining the power supply of the pump unit during the cyber attack.

2. The method as claimed in claim 1, wherein
   the evaluation unit is a local control device of the fluid-conveying device, and
   the evaluation unit is connectable to a computer network.

3. The method as claimed in claim 1, wherein
   the speed control of the fluid-conveying device is controlled by a frequency converter connected to the drive, and
   the drive is an electric motor.

4. The method as claimed in claim 3, wherein
   the evaluation unit detects switching cycles of the fluid-conveying device, speed limits, a rate of a speed change, vibrations, operating anomalies, or two or more of the switching cycles, the speed limits, the speed change rate, the vibrations and the operating anomalies by comparison a stored behavior of the fluid-conveying device, a learned behavior of the fluid-conveying device, or both.

5. The method as claimed in claim 4, wherein
   the evaluation unit includes a data memory configured to store data associated with the fluid-conveying device, the drive, the control system, or two or more of the fluid-conveying device, the drive and the control system.

6. The method as claimed in claim 1, wherein
   the evaluation unit determines unauthorized operation of the pump unit is occurring if the evaluation of the at least one first signal detects a pump unit state which does not occur in normal operation of the pump unit.

7. The method as claimed in claim 6, wherein
   the pump unit state which does not occur in normal operation of the pump unit includes an unauthorized change in operation which is permanently acting, or regularly occurring, intense, increasing in magnitude, indicative of structural anomaly, or two or more of permanently acting, or regularly occurring, intense, increasing in magnitude, indicative of structural anomaly.

8. The method as claimed in claim 1, wherein
   the at least one sensor is a radiation sensor, an acoustic sensor, a vibration sensor, a pressure sensor, a flow sensor, a speed sensor, a temperature sensor, or two or more of the radiation sensor, the acoustic sensor, the vibration sensor, the pressure sensor, the flow sensor, the speed sensor, and the temperature sensor.

9. The method as claimed in claim 1, wherein
   the adjusting step includes disconnection of components of the pump unit from a computer network or from a pump unit autonomous operation system.

10. The method as claimed in claim 9, wherein
    the disconnected components include the evaluation unit.

11. An cyber attack protection unit, comprising:
    an evaluation unit configured to protect a pump unit having a fluid-conveying device, a drive and a control system from unauthorized operation by receiving from at least one sensor at least one first signal corresponding to a speed of the fluid-conveying device, a speed control of the fluid-conveying device, or both;

evaluating the at least one first signal, wherein during the evaluation at least one target variable and at least one actual variable derived from the at least one first signal are compared with each other to determine whether a cyber attack is occurring;

outputting at least one second signal to the control system if the evaluation determines an unauthorized operation of the pump unit is occurring based on the at least one first signal, the at least one, wherein the control system is configured to, based on the at least one second signal, to control operation of the fluid-conveying device into a state of the pump unit in which the pump unit is protected from the cyber attack, further cyber attacks, or both, and to activate an energy storage device for maintaining the power supply of the pump unit during the cyber attack.

12. The cyber attack protection unit as claimed in claim 11, wherein the cyber attack protection unit includes a signal processing module configured to process the least one first signal, an evaluation module configured to evaluate the at least one first signal, an input/output unit, and a memory configured to store data associated with the fluid-conveying device, the drive, the control system, or two or more of the fluid-conveying device, the drive, the control system.

13. The cyber attack protection unit as claimed in claim 12, wherein the cyber attack protection unit configured to perform control of components of the pump unit automatically when unauthorized operation of the pump unit is determined to control operation of the fluid-conveying device into a state of the pump unit in which the pump unit is protected from the cyber attack, further cyber attacks, or both.

* * * * *